H. A. SEDGWICK AND K. F. KUMMER.
CONTROL MEANS FOR SPEED CHANGE GEARS.
APPLICATION FILED SEPT. 27, 1915.
1,334,561.
Patented Mar. 23, 1920.
2 SHEETS—SHEET 1.
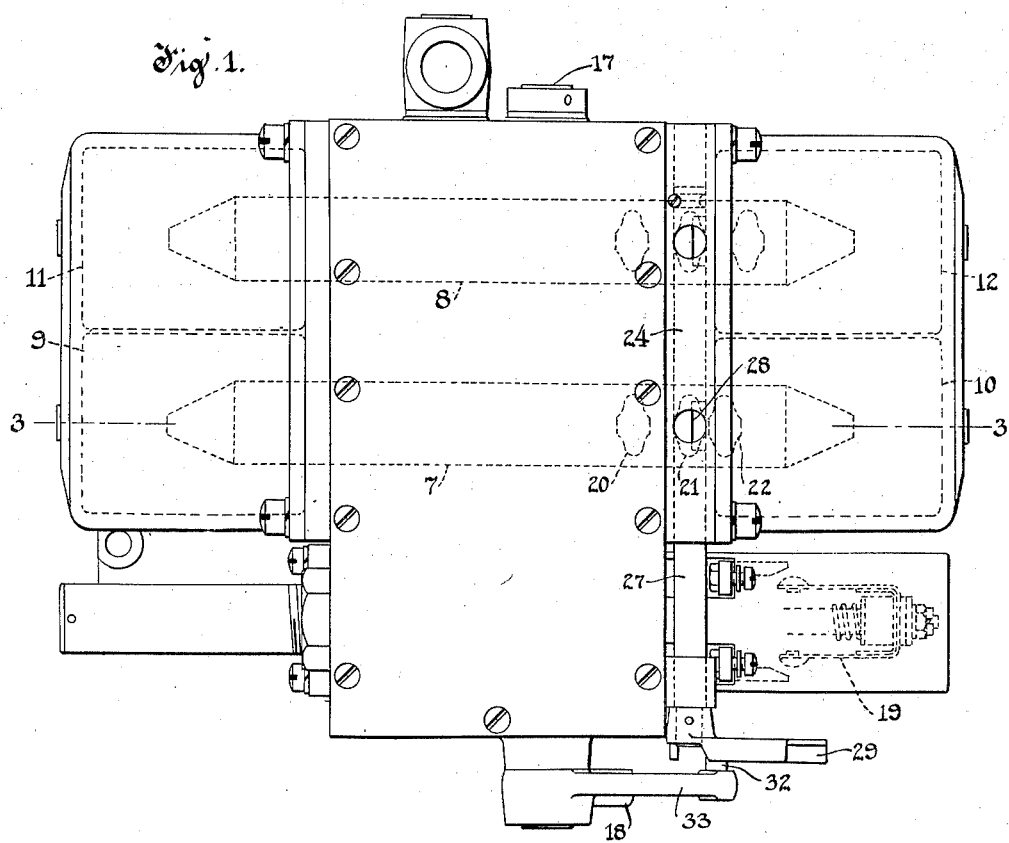
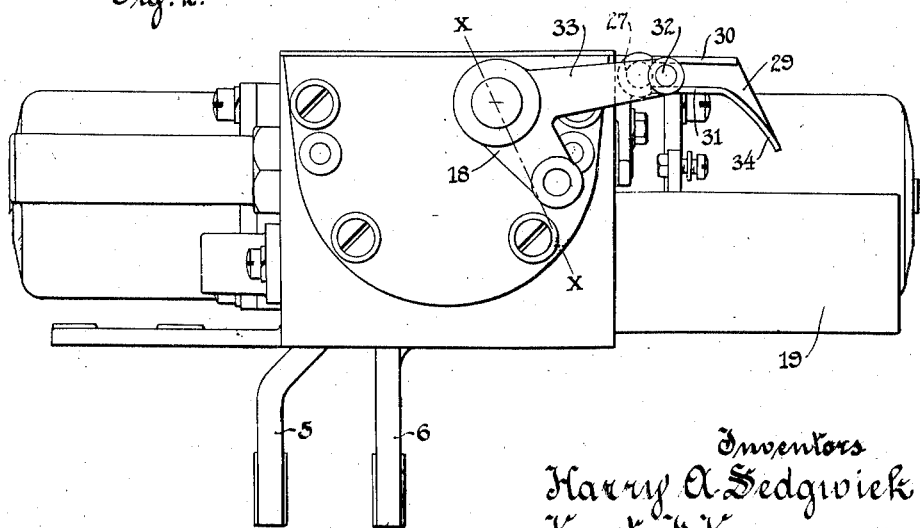
Inventors
Harry A. Sedgwick
Kurt F. Kummer
By Paulett Hubbard
Attorney H. A. SEDGWICK AND K. F. KUMMER.
CONTROL MEANS FOR SPEED CHANGE GEARS.
APPLICATION FILED SEPT. 27, 1915.
1,334,561.
Patented Mar. 23, 1920.
2 SHEETS—SHEET 2.
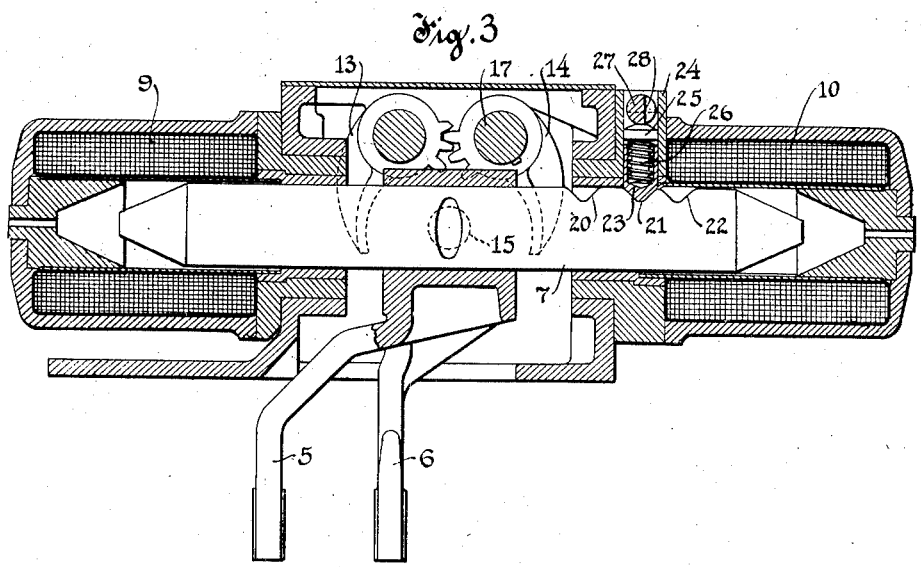
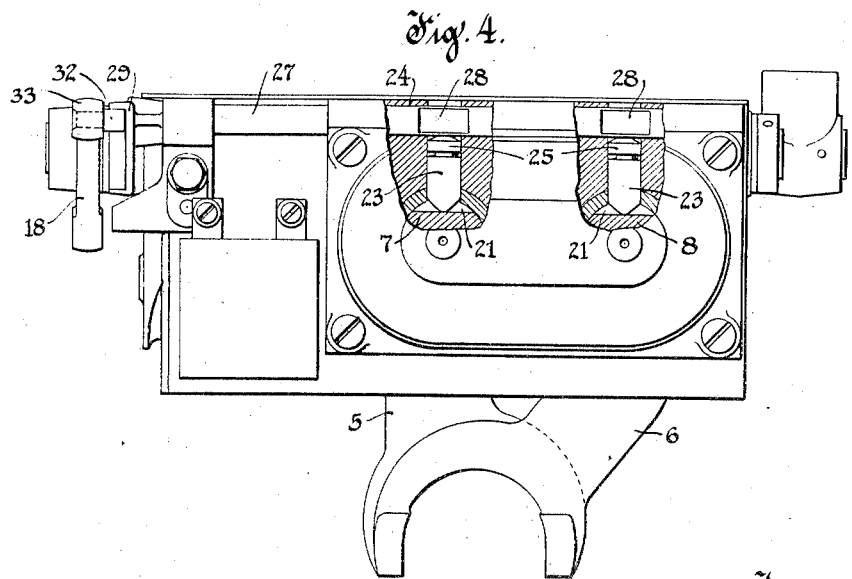

UNITED STATES PATENT OFFICE.

HARRY A. SEDGWICK AND KURT F. KUMMER, OF MILWAUKEE, WISCONSIN, ASSIGNORS TO THE CUTLER-HAMMER MFG. CO., OF MILWAUKEE, WISCONSIN, A CORPORATION OF WISCONSIN.

CONTROL MEANS FOR SPEED-CHANGE GEARS.

1,334,561.  Specification of Letters Patent.  Patented Mar. 23, 1920.

Application filed September 27, 1915. Serial No. 52,874.

*To all whom it may concern:*

Be it known that we, HARRY A. SEDGWICK and KURT F. KUMMER, citizens of the United States, residing at Milwaukee, in the county of Milwaukee and State of Wisconsin, have invented new and useful Improvements in Control Means for Speed-Change Gears, of which the following is a full, clear, concise, and exact description, reference being had to the accompanying drawing, forming a part of this specification.

This invention relates to improvements in control means for speed change gears for automobiles and the like.

Gear sets of the aforesaid character are commonly provided with spring pressed dogs to yieldingly lock the same in the different operative positions thereof and such dogs have in numerous instances been found inadequate for such purposes. This is especially true where the sliding gears are not accurately fitted to their shafts with the result that when in operation they creep to neutral position.

This invention has among its objects to provide more positive means to retain or lock the gears in their selected relations.

A further object is to provide control means for gear sets of the character described including means to lock and unlock the gears incidentally to the operation of said control means.

A still further object is to provide locking means adapted for incorporation in automatic gear shifting mechanism, such, for example, as the electrical shift.

Other objects and advantages of the invention will hereinafter appear.

The accompanying drawing illustrates one embodiment of the invention which will now be described, it being understood that the invention is susceptible of various modifications falling within the scope of the appended claims.

In the accompanying drawing,

Figure 1 is a top plan view of the control device;

Fig. 2 is a side elevation of Fig. 1;

Fig. 3 is a sectional view on line 3—3, Fig. 1; and,

Fig. 4 is an end view of Fig. 3 but partially in section.

The device illustrated includes a well known solenoid shifting mechanism of the construction disclosed in the McCarroll application, Serial No. 874,698, filed Nov. 30, 1914. Briefly describing this mechanism and first referring to Fig. 3, it includes gear actuating forks 5 and 6 mounted upon bars or rods 7 and 8 respectively which constitute plungers for operating windings. As illustrated the rod 7 is provided with windings 9 and 10 and rod 8 with windings 11 and 12 whereby each is adapted to be moved in opposite directions from a neutral position. Return of the rods and forks to neutral position is effected mechanically by interlocked pawls 13 and 14 acting on lugs 15 projecting centrally from said rods on adjacent sides thereof. The pawls are arranged between the two rods and on opposite sides of said lugs and the pawl 14 is fixed to a revoluble shaft 17 operatively connected through a suitable mechanism to an actuating lever 18 (Figs. 1, 2 and 4). Thus when the lever 18 is operated to turn the shaft 17 clockwise the pawls 13 and 14 are forced together to engage the lug 15 of whichever rod is out of neutral position and to thereby restore such rod to neutral position. In use the lever 18 is connected to the clutch pedal of the car for operation after disengagement of the clutch and said lever controls in addition to the neutralizing mechanism, a master switch 19 for the operating windings. Referring to Fig. 2 the lever 18 stands in the position illustrated during movement of the clutch pedal for control of the clutch exclusively, whereas upon further movement of the clutch pedal said lever is moved to the left to progressively neutralize the shifting rods and forks and to close the master switch to energize the winding preselected by the operator's switch. Energization of any winding accordingly shifts one of the rods thereby setting the gears for operation whereupon the clutch pedal is released to reëngage the clutch and restore the lever 18 to the position illustrated in Fig. 2. Here it may be noted that the lever 18 does not actuate the neutralizing mechanism immediately upon movement from the position but has a limited idle movement represented by the dotted line X—X.

Considering now the locking mechanism, each rod, as shown in Fig. 3, is provided with three locking notches 20, 21 and 22, the first for one extreme position, the second for neutral position and the third for the opposite extreme position. These notches are provided to receive latching or locking dogs 23, one for each rod. These dogs slide in vertical guide-ways in a block 24 secured to or integral with the casing of the above described mechanism and as best illustrated in Fig. 3, each dog is hollow and contains a loose stud 25 and an interposed coil spring 26. As will hereinafter appear the springs tend under all conditions, to hold the dogs in locking position and the extremities of said dogs are therefore rounded and the walls of the notches inclined as usual. On the other hand, restraining means are provided for the dogs to effect a positive lock of the shifting rods. This restraining means includes a rod 27 arranged above and extending transversely of the dogs, said rod being revolubly mounted in the block 24 and reduced to a substantially semi-circular cross section contiguous to each of the dogs. The rod thus provides in effect two cams 28 to depress and release the studs while the heads of the studs form abutments for the dogs and hence limit the upward movement of the latter according to the angular position of the rod. In the angular position of the rod shown in Fig. 3 the studs are depressed and serve to positively lock the dogs in the notches of the shifting rod. The studs as shown are not depressed into engagement with the pawls but the clearance therebetween is sufficiently reduced as to positively insure against release of the dogs. On the other hand, clockwise rotation of the rod will release the studs thereby releasing the dogs for disengagement from the notched shifting rods but subject to the opposing pressure of the springs 26.

The locking rod 27 is provided at its end with a lever 29 (Fig. 2) having an operative connection with the control lever 18 above described. The lever 29 is provided with two parallel flanges 30 and 31 forming a channel in which works a pin 32 fixed to the end of an arm 33 fast to the hub of the lever 18. Thus when the lever 18 is turned it will rotate the lever 29 in a corresponding direction so long as the pin 32 travels in the rectilinear channel in the lever 29. On the other hand, when the pin leaves the channel it engages a curved flange 34 on the lever 29 which maintains an interlock between the two levers while permitting independent movement of lever 18.

Thus assuming that the lever 29, when in the position illustrated in Fig. 2, positions the locking rod 27 as illustrated in Fig. 3, it will be observed that in the normal position of the lever 18 the shifting rods will be positively locked against movement. If however, the lever 18 be operated as above described to neutralize or to effect a further adjustment of either shifting rod, it will, through its connection with the lever 29, revolve the locking shaft to release the locking dogs. Moreover the connection is so designed as to effect release of the locking dogs upon initial movement of the lever 18 and prior to positioning of said lever for neutralizing or, in other words, during movement of lever 18 to its dotted line position. Thereafter the pin 32 of lever 18 idly travels over the curved flange 34 of the lever 29 thereby enabling continued movement of lever 18 to neutralize and to effect closure of switch 19 if desired. The parts then remain in the same relation until the lever 18 is returned to normal position, during which operation the pin 32 reënters the channel in the lug 29 and thereby restores the rod 27 to locking position. Thus the dogs are released incidentally to each neutralizing and shifting operation and then relocked as soon as the lever 18 is returned to normal position. In the interim the dogs are unrestrained but for the pressure of their springs 26. This, however, is in no wise objectionable inasmuch as the gears are idle or at least under no strain, until the clutch of the car is engaged, at which time the lever 18 is restored to normal position and the locking rod 27 restored to locking position. Obviously the above described mechanism might be modified by dispensing with the flange 30 and substituting an independent means for biasing the locking rod 27 to locking position, whereby the lever 18 need function only for unlocking.

While the primary advantage of the mechanism lies in the security of the lock thus afforded, said mechanism also embodies another distinct advantage, namely, a reduction in the frictional resistance offered by the locking dogs to the electromagnetic operation of the shifting rods. Obviously devices which rely entirely upon the spring pressure of the dogs will require much stronger springs than the present mechanism with a consequent increased resistance.

What we claim as new and desire to secure by Letters Patent is:

1. In a control mechanism for speed change gears, in combination, power gear-operating means, releasable gear-locking means, and common control means therefor, said control means providing for progressively releasing said locking means, applying power to said operating means and resetting said locking means.

2. In a control mechanism for speed change gears, in combination, operating means, locking means and an operative connection therebetween to effect unlocking operation of the latter means upon initial operation of the former means for gear changing and to subsequently effect resetting of said latter means.

3. In a control mechanism for speed change gears, the combination with operating means including a member movable in a given direction for each gear change operation and then returnable to initial position, of a locking device operatively connected to said member for unlocking operation upon initial movement of said member in said given direction.

4. In a control mechanism for speed change gears, the combination with operating means including a member movable in a given direction for each gear change operation and then returnable to initial position, of a locking device operatively connected to said member for unlocking operation upon initial movement of said member in said given direction and for resetting operation upon return movement of said member.

5. In a control mechanism for speed change gears, in combination, power gear setting means, mechanical gear neutralizing means and gear locking means actuated by said neutralizing means.

6. In a control mechanism for speed change gears, in combination, a power operated gear shifting member, a releasable locking device for said member and common control means for said power operated shifting member and said device to effect unlocking operation of the former prior to response of the latter and resetting of the former after response of the latter.

7. In a control mechanism for speed change gears, in combination, a power operated gear shifting member, a releasable locking device therefor and a neutralizing device jointly controlling said power operated member and said locking device to effect release of said locking device for both neutralizing and shifting operations and to effect subsequent resetting of said locking device.

8. In a control mechanism for speed change gears, in combination, gear shifting members having power operating means, means for locking said members in their different positions and a gear neutralizing device jointly controlling said locking means and the power operation of said member, said device normally standing in a position to set said locking means and acting upon said means to release said members for neutralization and subsequent operation thereof.

9. In a locking mechanism for speed change gears, in combination, a lockable member, a locking dog therefor having a spring pressing the same against said member, and a cam device coöperating with said dog to releasably lock the same for positive restraint of said member.

10. In a control mechanism for speed change gears, in combination, gear actuating means and gear locking means including a locking dog and a releasable locking device for said dog operatively connected to said actuating means.

11. In a control mechanism for speed change gears, in combination, gear actuating means and gear locking means including a dog having a spring to bias the same to locking position and a releasable locking device for said dog operatively connected to said actuating means.

12. In a control mechanism for automobile speed change gears, in combination, a member responsive to movement of the automobile clutch pedal, gear-locking mechanism including a locking dog, and a cam device operatively connected to said member for positively securing said dog in locking position during engagement of the clutch.

13. In a locking mechanism for speed change gears, in combination, a lockable member, operating means therefor, a locking dog for said member and means interlocked with said operating means for positively securing said dog in locking position subject to release thereof at will.

In witness whereof we have each hereunto subscribed our names.

HARRY A. SEDGWICK.
KURT F. KUMMER.